United States Patent
Frasure et al.

(10) Patent No.: US 9,342,969 B2
(45) Date of Patent: May 17, 2016

(54) PNEUMATIC DETECTOR ASSEMBLY WITH BELLOWS

(71) Applicant: Kidde Technologies, Inc., Wilson, NC (US)

(72) Inventors: David Frasure, Wilson, NC (US); Steven Wallace, Raleigh, NC (US); William Brett Standifer, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 14/515,886

(22) Filed: Oct. 16, 2014

(65) Prior Publication Data

US 2016/0110979 A1    Apr. 21, 2016

(51) Int. Cl.
*G08B 17/06* (2006.01)
*G08B 17/04* (2006.01)

(52) U.S. Cl.
CPC ............... *G08B 17/04* (2013.01); *G08B 17/06* (2013.01)

(58) Field of Classification Search
None
See application file for complete search history.

(56) References Cited

U.S. PATENT DOCUMENTS

| | | | |
|---|---|---|---|
| 2,522,248 A | 9/1950 | Bair | |
| 3,122,728 A | 2/1964 | Lindberg | |
| 3,760,393 A | 9/1973 | Lindberg | |
| 3,896,423 A * | 7/1975 | Lindberg | |
| 3,921,563 A * | 11/1975 | Edwards et al. | |
| 4,648,460 A * | 3/1987 | McCulloch | |
| 4,706,063 A * | 11/1987 | Kelly | G01K 5/42 200/83 C |
| 4,851,627 A * | 7/1989 | Sakakino | H01H 35/32 200/83 C |
| 5,028,749 A * | 7/1991 | Hodate | H01H 35/32 200/61.25 |
| 5,032,818 A * | 7/1991 | Zanon | H01H 37/10 337/319 |
| 5,035,582 A * | 7/1991 | Carroll | B60T 17/02 417/18 |
| 5,118,909 A * | 6/1992 | Husting | H01H 3/24 200/302.2 |
| 5,136,278 A * | 8/1992 | Watson et al. | |
| 5,621,389 A * | 4/1997 | Fellows | |
| 5,691,702 A * | 11/1997 | Hay | |
| 5,825,285 A * | 10/1998 | Sawafuji | B60C 23/0433 116/34 R |
| 2001/0027960 A1* | 10/2001 | Makino | H01B 17/50 218/139 |
| 2001/0035397 A1* | 11/2001 | Shioiri | H01H 33/66261 218/118 |
| 2005/0155953 A1* | 7/2005 | Nitert | |
| 2006/0278010 A1* | 12/2006 | Montesclaros et al. | |
| 2008/0289835 A1* | 11/2008 | Chavez | |
| 2009/0173160 A1* | 7/2009 | Mosely et al. | |
| 2009/0236205 A1* | 9/2009 | Nalla et al. | |
| 2011/0121977 A1 | 5/2011 | Nalla et al. | |
| 2014/0117103 A1* | 5/2014 | Rossi et al. | |
| 2015/0097677 A1* | 4/2015 | Frasure et al. | |

FOREIGN PATENT DOCUMENTS

GB    2063536    *  6/1981    ............ G08B 17/04

OTHER PUBLICATIONS

European Search Report for application No. EP15190003.2; Mailing Date Dec. 3, 2015, 9 pages.

* cited by examiner

*Primary Examiner* — Ojiako Nwugo
(74) *Attorney, Agent, or Firm* — Cantor Colburn LLP

(57) ABSTRACT

In one aspect, a pneumatic detector assembly is provided. The assembly includes a housing, a sensor tube, a contact pin, and at least one switch having a bellows operatively associated with the sensor tube and the contact pin. The bellows is configured to move into and out of contact with the contact pin based on a pressure in the sensor tube.

9 Claims, 3 Drawing Sheets

PNEUMATIC DETECTOR ASSEMBLY WITH BELLOWS

BACKGROUND OF THE INVENTION

Reliable fire detection is critical for many aircraft. Common thermal fire detector types include point thermocouple, point thermistor, continuous thermocouple, continuous thermistor, resistance wire, and pneumatic tube.

Some pneumatic tube detector systems include a titanium or vanadium wire inserted into a capillary sensor tube. The wire is exposed to and absorbs high temperature energy and pressurized hydrogen gas and subsequently stores the gas as the wire cools to form a hydrogen saturated wire. This saturated wire is inserted into a sensor tube, which is pressurized with an inert gas, and sealed at both ends to form a pressure vessel, which can be used as a pneumatic detector. One of the ends of the pressure vessel is incorporated into a housing that includes a plenum, where alarm and integrity switches are located.

When the sensor tube portion of the pneumatic detector is exposed to high temperature, the pressure is increased inside the tube as the inert gas expands in accordance to physical gas laws. Such pneumatic fire detectors may include diaphragms that are pre-formed prior to assembly. The detectors may also include part of the gas seal for the device. The diaphragms may be pre-formed to operatively position the diaphragm in various positions such as, for example: (a) an open switch (alarm switch) condition requiring the background pressure to increase to create a closed or alarm condition; or (b) a maintained closed switch (integrity switch) condition with the background pressure.

For an alarm switch configuration, the diaphragm may be deformed so it is responsive to a predetermined background pressure to further deform sufficiently outward and create a closed switch. The diaphragm may also be deformed such that a portion of the interior side of the disc forms part of the pressure seal for the plenum. With this configuration, in the event of an overheat or fire condition, pressure in the sensor tube and plenum will rise. If a predetermined high temperature condition is reached, the pressure within the plenum will increase to such an extent that the diaphragm will be deformed outward and into electrical contact and create a closed switch.

For an integrity switch configuration, the diaphragm may be deformed so that the diaphragm responds to a predetermined drop in background pressure and deforms sufficiently inward to lose electrical contact with a switch. The diaphragm may also be deformed such that a portion of the interior side of the diaphragm forms part of the pressure seal for the plenum. With this configuration, the integrity switch opens if a loss of pressure occurs in the sensor tube or plenum. If a predetermined pressure loss occurs, the pressure within the plenum will decrease to such an extent that the diaphragm will lose electrical contact and create an open switch.

However, such pneumatic detectors may have complex designs, numerous parts, and may be hard to manufacture. Accordingly, it is desirable to provide a pneumatic detector assembly having a less complex design, fewer parts, reduced amount of brazing or welding of parts, overall ease of manufacture, and reduced tests to ensure hermeticity of the assembly.

BRIEF DESCRIPTION OF THE INVENTION

In one aspect, a pneumatic detector assembly is provided. The assembly includes a housing, a sensor tube, a contact pin, and at least one switch having a bellows operatively associated with the sensor tube and the contact pin. The bellows is configured to move into and out of contact with the contact pin based on a pressure in the sensor tube.

In another aspect, a method of assembling a pneumatic detector assembly is provided. The method includes providing a sensor tube, providing a contact pin, and providing at least one switch having a bellows. The method further includes operatively coupling the bellows to the sensor tube and the contact pin such that the bellows is configured to move into and out of contact with the contact pin based on a pressure in the sensor tube

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
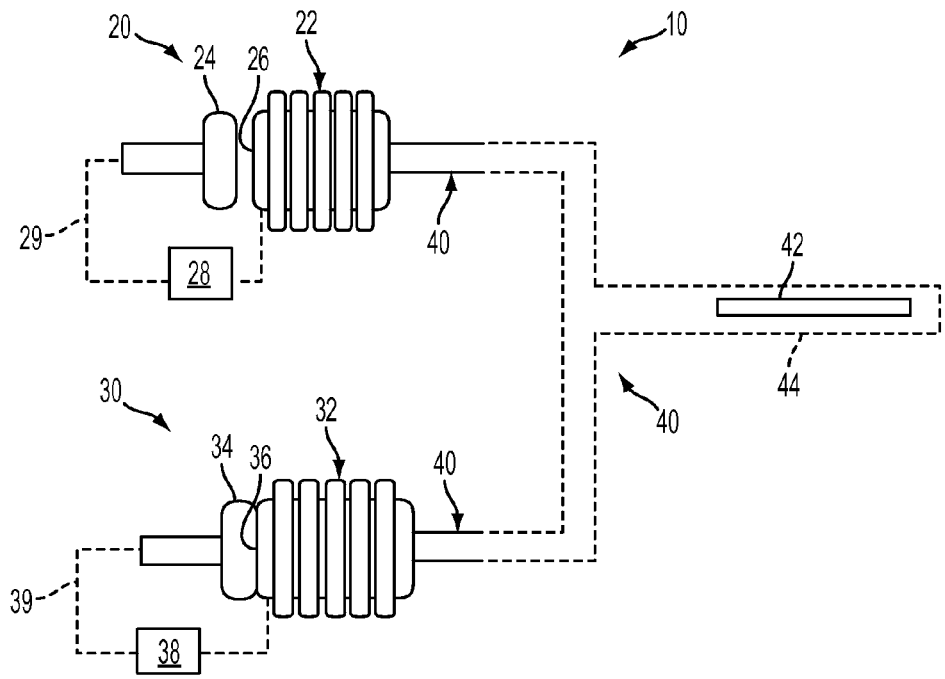
FIG. 1 is a schematic illustration of an exemplary pneumatic detector assembly in a first position.
Figure 2A:
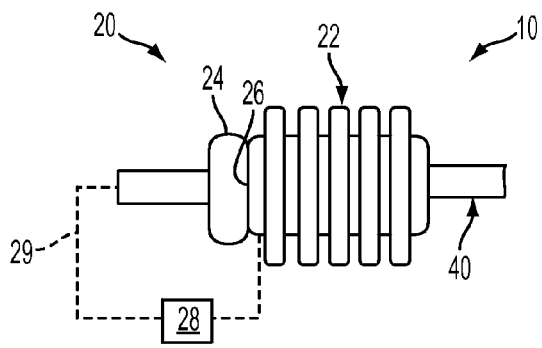
FIGS. 2A and 2B are a schematic illustrations of a portion of the assembly shown in FIG. 1 in a second position.
Figure 2B:
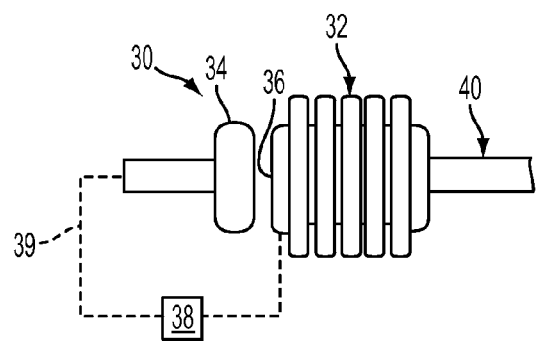

FIGS. 1, 2A, and 2B illustrate an exemplary pneumatic detector assembly 10 that generally includes an alarm switch 20, a fault (integrity) switch 30, and a sensor tube 40. FIG. 1 illustrates switches 20, 30 in normal operating positions, and FIGS. 2A and 2B illustrate switches 20, 30 in alarm/fault positions.

Although pneumatic detector assembly 10 is illustrated with one alarm switch 20 and integrity switch 30, assembly 10 may have any number or combination of switches 20, 30. Alarm switch 20, fault switch 30, and at least a portion of sensor tube 40 may be packaged in one or more hermetically sealed housings (not shown).

Alarm switch 20 is coupled to sensor tube 40 and includes a bellows 22 and a contact pin 24. In the exemplary embodiment, the location of contact pin 24 is adjustable. However, contact pin 24 may be fixed in a desired location. Bellows 22 includes a contact face 26 and is connected to a power source 28. A power return 29 is connected to contact pin 24, which facilitates establishing an electrical continuity between bellows 22 and contact pin 24 when bellows 22 contacts the contact pin 24 (FIG. 2A). This electrical connection or continuity indicates an alarm, which may be communicated to another device or system (e.g., a controller), which may subsequently generate an alarm signal and/or issue an alarm (e.g., a visual or audible warning).

Bellows 22 is designed to respond in a predetermined manner in response to pressure outputs generated by sensor tube 40 to ensure contact face 26 will come in contact with contact pin 24 at those pressure outputs. For example, bellows 22 may be designed with a predetermined spring rate, effective area, convolutions, material thickness/type, and/or other properties that may be varied during manufacture of bellows 22. With a known expansion/contraction of bellows 22 for a given pressure, contact pin 24 and bellows 22 may be located apart from each other at a predetermined distance 'D1' to ensure contact therebetween at that given pressure.

In addition, an intermediate or pre-alarm switch (e.g., an overheat switch, not shown) may be used as a warning that a component or compartment is hotter than normal operation temperatures, but has not yet reached a fire alarm condition. Such a switch would function in the same manner as alarm switch 20 and bellows 22 described above. For example, the switch may be designed to respond in a predetermined manner in response to pressure outputs generated by sensor tube 40 to ensure that its contact face would come into contact with its contact pin at the desired pressure outputs. For example, the switch may be designed with a predetermined spring rate, effective area, convolutions, material thickness/type, and/or other properties that may be varied during manufacture of the bellows that would differ somewhat from alarm switch 20 and bellows 22. With a known expansion/contraction of its bellows for a given pressure, which would normally be below the pressure to activate alarm switch 20 and bellows 22, its contact pin and bellows may be located apart from each other at a predetermined distance different than D1 to ensure contact therebetween at that given pressure.

Integrity switch 30 is coupled to sensor tube 40 and includes a bellows 32 and a contact pin 34, which may have a fixed or adjustable location. Bellows 32 includes a contact face 36 and is connected to a power source 38. A power return 39 is connected to contact pin 34, which facilitates establishing an electrical continuity between bellows 32 and contact pin 34 when bellows 32 contacts the contact pin 34. As shown in FIG. 2B, a loss of electrical connection or continuity indicates a fault, which may be communicated to another device or system (e.g., a controller), which may subsequently generate an alarm signal and/or issue an alarm (e.g., a visual or audible warning).

Bellows 32 is similarly designed to respond in a predetermined manner in response to pressure outputs generated by sensor tube 40 to ensure contact face 36 will break electrical contact with contact pin 24 at those pressure outputs. For example, bellows 32 may be designed with a predetermined spring rate, effective area, convolutions, material thickness/type, and/or other properties that may be varied during manufacture of bellows 32. With a known expansion/contraction of bellows 32 for a given pressure, contact pin 34 and bellows 32 may be initially located in contact, but configured to be located apart from each other at a predetermined distance 'D2' to ensure no electrical contact therebetween at that given pressure.

In the exemplary embodiment, sensor tube 40 includes a core element 42, which stores hydrogen gas and is spiral wrapped to allow a gas path in the event of sensor damage (e.g., crushing). A pressurized helium gas is disposed between a wall 44 and core 42.

In operation, ambient helium gas pressure in sensor tube 40 is directly related to average temperature in, for example, an airplane engine compartment. Engine compartment overheat or fire conditions (as applicable) causes a proportionate rise in gas pressure in sensor tube 40, and when the compartment temperature rises to a factory set alarm rating, the rising gas pressure expands bellows 22 and closes alarm switch 20 (FIG. 2A). When compartment cooling reduces the gas pressure, alarm switch 20 opens (i.e., bellows 22 contracts) and is ready to respond again. When sensor tube 40 is cut, the helium gas escapes and integrity switch 30 opens (i.e., bellows 32 contracts) (see FIG. 2B).

As such, alarm switch 20 which is normally opened (FIG. 1) would close in response to an overheat or fire condition (FIG. 2A). This would be caused by an increase in gas pressure in sensor tube 40, which would force bellows contact face 26 against contact pin 24. Similarly, if sensor tube 40 was cut or lost pressure, which would release its gas pressure, integrity switch 30 which is normally closed (FIG. 1) between bellows contact face 36 and contact pin 34 would open (FIG. 2B), indicating a fault condition of assembly 10.

A method of assembling pneumatic detector assembly 10 includes providing alarm switch 20 and/or integrity switch 30 and providing sensor tube 40. Alarm switch 20 is provided with bellows 22 and contact pin 24, and integrity switch 30 is provided with bellows 32 and contact pin 34. Bellows 22 is operably coupled to sensor tube 40, and bellows 22 and contact pin 24 are located at a predetermined distance from each other that corresponds to a distance of travel of bellows 22 when sensor tube 40 reaches a predetermined pressure. Bellows 32 is operably coupled to sensor tube 40, and bellows 32 is located in contact with contact pin 34. Bellows 32 is configured to retract and break electrical contact with contact pin 34 when sensor tube 40 reaches a predetermined pressure.

Figure 3:
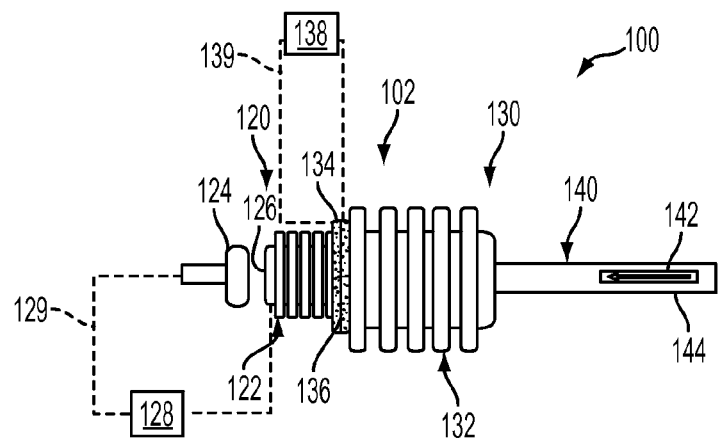
FIG. 3 is a schematic illustration of another exemplary pneumatic detector assembly in a first position.
Figure 4:
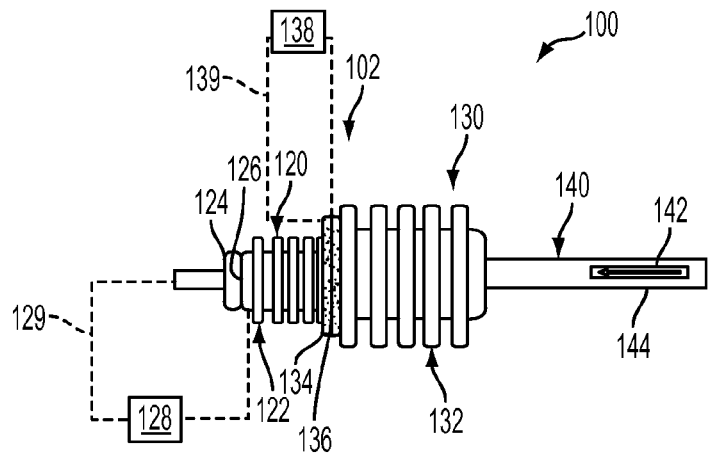
FIG. 4 is a schematic illustration of the assembly shown in FIG. 3 in a second position.
Figure 5:
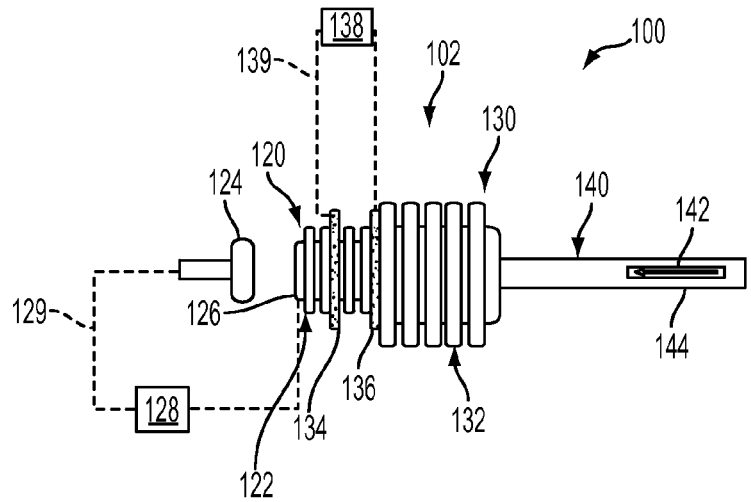
FIG. 5 is a schematic illustration of the assembly shown in FIG. 3 in a third position.

FIGS. 3-5 illustrate an exemplary pneumatic detector assembly 100 that is similar to assembly 10 except it includes a combined alarm and integrity switch 102 having an alarm switch portion 120, an integrity switch portion 130, and a sensor tube 140. FIG. 3 illustrates combined alarm and integrity switch 102 in a normal operating position, FIG. 4 illustrates alarm switch portion 120 in an alarm position, and FIG. 5 illustrates integrity switch portion 130 in a fault position.

Alarm switch portion 120 is coupled to sensor tube 140 and includes a bellows 122 and a contact pin 124, which may have a fixed or adjustable location. Bellows 122 includes a contact face 126 and is connected to a power source 128. A power return 129 is connected to contact pin 124, which facilitates establishing an electrical continuity between bellows 122 and contact pin 124 when bellows 122 contacts the contact pin 124 (FIG. 4). This electrical connection or continuity indicates an alarm, which may be communicated to another device or system that may subsequently generate an alarm signal and/or issue an alarm.

Integrity switch portion 130 is coupled to alarm switch portion 120 and sensor tube 140 and includes a bellows 132 and a contact pin 134, which may have a fixed or adjustable location. Bellows 132 includes a contact face 136 and is connected to a power source 138. A power return 139 is connected to contact pin 134, which facilitates establishing an electrical continuity between bellows 132 and contact pin 134 when bellows 132 contacts the contact pin 134. As shown in FIG. 5, a loss of electrical connection or continuity indicates a fault, which may be communicated to another device or system to generate an alarm signal and/or issue an alarm (e.g., a visual or audible warning).

Bellows 122, 132 are designed to respond in a predetermined manner in response to pressure outputs generated by sensor tube 140 to ensure contact faces 126, 136 will establish/break contact with contact pins 124, 134 at those pressure outputs. With a known expansion/contraction of bellows 122, 132 for a given pressure, contact pins 124, 134 and bellows 122, 132 may be located apart from each other at a predetermined distance 'D1', 'D2' to ensure contact/no contact therebetween at that given pressure.

In the exemplary embodiment, sensor tube 140 includes a core element 142, which stores hydrogen gas and is spiral wrapped to allow a gas path in the event of sensor damage. A pressurized helium gas is disposed between a wall 144 and core 142.

In operation, alarm switch portion 120 which is normally opened (FIG. 3) closes in response to an overheat or fire condition (FIG. 4). This would be caused by an increase in gas pressure in sensor tube 140, which would force bellows contact face 126 against contact pin 124. Similarly, if sensor tube 140 is cut or loses pressure, which would release its gas pressure, integrity switch portion 130 which is normally closed (FIG. 3) between bellows contact face 136 and contact pin 134 would open (FIG. 5), indicating a fault condition of assembly 100.

A method of assembling pneumatic detector assembly 100 includes providing combined alarm and integrity switch 102 having alarm switch portion 120 and integrity switch portion 130. In the exemplary embodiment, alarm switch portion 120 is coupled to integrity switch portion 130 (e.g., by welding) and switch portions 120, 130 are operably coupled to provided sensor tube 140. Alarm switch portion 120 is provided with bellows 122 and contact pin 124, and integrity switch portion 130 is provided with bellows 132 and contact pin 134. Bellows 122 and contact pin 124 are located at a predetermined distance from each other that corresponds to a distance of travel of bellows 122 when sensor tube 140 reaches a predetermined pressure. Bellows 132 is located in contact with contact pin 134 and is configured to retract and break contact with contact pin 134 when sensor tube 140 reaches a predetermined pressure.

Figure 6:
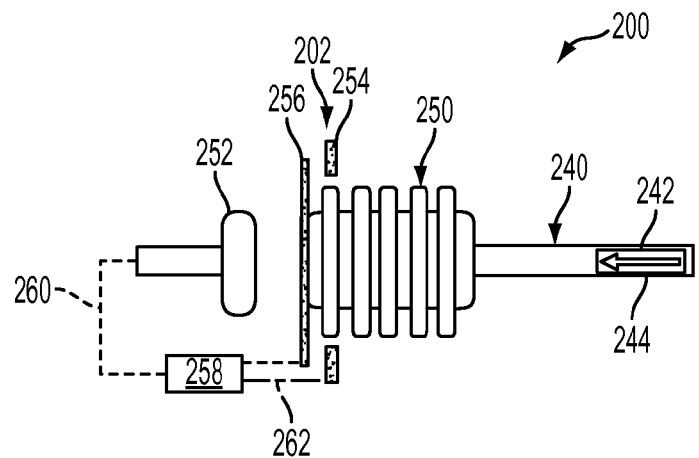
FIG. 6 is a schematic illustration of another exemplary pneumatic detector assembly in a first position.
Figure 7:
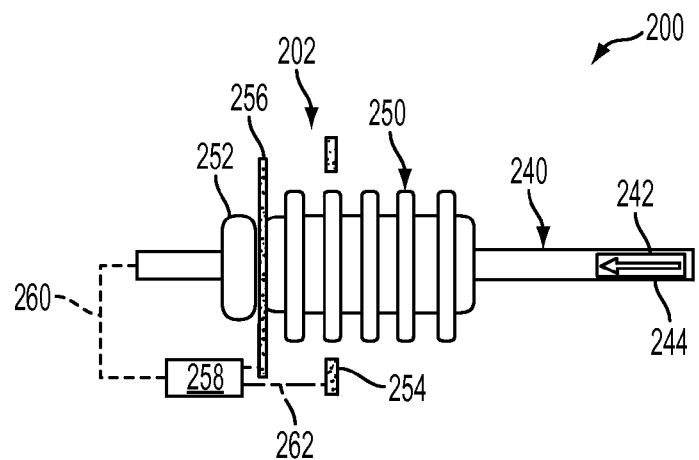
FIG. 7 is a schematic illustration of the assembly shown in FIG. 6 in a second position.
Figure 8:
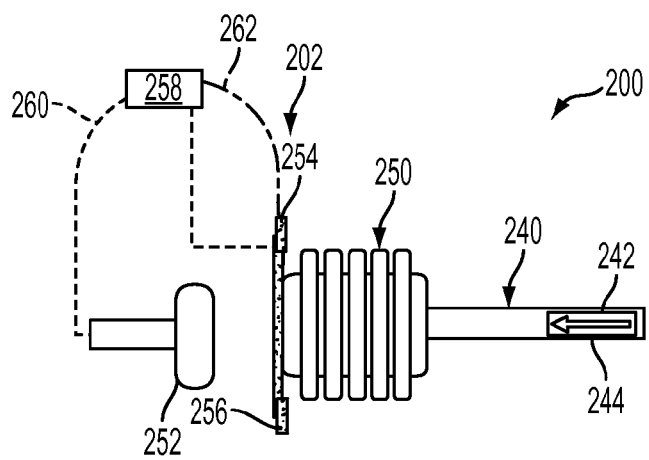
FIG. 8 is a schematic illustration of the assembly shown in FIG. 6 in a third position.

FIGS. 6-8 illustrate an exemplary pneumatic detector assembly 200 that is similar to assembly 10 except it includes a combined alarm and integrity switch 202 and a sensor tube 240. FIG. 6 illustrates combined alarm and integrity switch 202 in a normal operating position, FIG. 7 illustrates combined switch 202 in an alarm position, and FIG. 8 illustrates combined switch 202 in a fault position.

In the exemplary embodiment, combined alarm and integrity switch 202 is coupled to sensor tube 240 and includes a bellows 250, an alarm contact point 252, and an integrity contact point 254. Contact points 252, 254 may have a fixed or adjustable location. In the exemplary embodiment, integrity contact point 254 is annular and has an inner diameter that is larger than an outer diameter of bellows 250 to enable bellows 250 to extend therethrough.

Bellows 250 includes a contact face 256 and is connected to a power source 258. A power return 260 is connected to alarm contact point 252 and a power return 262 is connected to integrity contact point 254. Power returns 260, 262 respectively establish an electrical continuity (e.g., completed electrical circuit) between bellows 250 and contact points 252, 254 when bellows 250 expands to contact the contact point 252 (FIG. 7) or retracts to contact the contact point 254 (FIG. 8). This electrical connection or continuity indicates an alarm or fault, which may be communicated to another device or system (e.g., monitoring system) for subsequent generation of an alarm/fault signal and/or issue of an alarm.

In the exemplary embodiment, sensor tube 240 includes a core element 242, which stores hydrogen gas and is spiral wrapped to allow a gas path in the event of sensor damage. A pressurized helium gas is disposed between a wall 244 and core 242.

Bellows 250 is designed to respond in a predetermined manner in response to pressure outputs generated by sensor tube 240 to ensure contact face 256 will come in contact with contact points 252, 254 at those pressure outputs. With a known expansion/contraction of bellows 250 for a given pressure, contact points 252, 254 and bellows 250 may be located apart from each other at a predetermined distance 'D1', 'D2' to ensure contact therebetween at that given pressure.

As such, combined switch 202 which is normally opened (FIG. 6) would close in response to an overheat or fire condition (FIG. 7). This would be caused by an increase in gas pressure in sensor tube 240, which would force bellows contact face 256 against alarm contact point 252. Similarly, if sensor tube 240 was cut or lost pressure, which would release its gas pressure, combined switch 202 which is normally open (FIG. 1), would force bellows contact face 256 against integrity contact point 254, thereby indicating a fault condition of assembly 200.

A method of assembling pneumatic detector assembly 200 includes providing combined alarm and integrity switch 202 and providing sensor tube 240. Switch 202 is provided with bellows 250, alarm contact point 252, and integrity contact point 254. Bellows 250 is operably coupled to sensor tube 240, and bellows contact face 256 and alarm contact point 252 are located at a predetermined distance from each other that corresponds to a distance of travel of bellows 250 when sensor tube 240 reaches a predetermined pressure. Bellows contact face 256 and integrity contact point 254 are located at a predetermined distance from each other that corresponds to a distance of travel of bellows 250 when sensor tube 240 reaches a predetermined pressure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pneumatic detector assembly comprising:
   a housing;
   a sensor tube;
   a contact pin; and
   at least one switch having a bellows operatively associated with the sensor tube and the contact pin, wherein the bellows is configured to move into and out of contact with the contact pin based on a pressure in the sensor tube;
   wherein the contact pin comprises a first contact pin and a second contact pin, and the at least one switch comprises:
   an alarm switch having a first bellows configured to be out of contact with the first contact pin in a normal operating condition and to be in contact with the first contact pin in an alarm condition; and
   an integrity switch having a second bellows configured to be in contact with a second contact pin in a normal operating condition and to be out of contact with the second contact pin in a fault condition.

2. The assembly of claim 1, wherein the first bellows is coupled to the second bellows.

3. The assembly of claim 1, wherein the contact pin comprises a first contact pin and a second contact pin, and the bellows includes a contact face, wherein the contact face is configured to be out of contact with the first contact pin in a normal operating condition and to be in contact with the first contact pin in an alarm condition, and wherein the contact face is configured to be out of contact with the second contact pin in a normal operating condition and to be in contact with the second contact pin in a fault condition.

4. The assembly of claim 3, wherein the second contact pin is annular.

5. The assembly of claim 1, further comprising a power source coupled to at least one of the bellows and the contact pin.

6. The assembly of claim 1, further comprising:

a first power source coupled to at least one of the first bellows and the first contact pin; and a second power source coupled to at least one of the second bellows and the second contact pin.

7. The assembly of claim 3, further comprising power source coupled to at least one of the bellows, the first contact pin, and the second contact pin.

8. A method of assembling a pneumatic detector assembly, the method comprising:

providing a sensor tube;

providing a contact pin;

providing at least one switch having a bellows; and operatively coupling the bellows to the sensor tube and the contact pin such that the bellows is configured to move into and out of contact with the contact pin based on a pressure in the sensor tube;

wherein the step of providing a contact pin comprises providing first contact pin and a second contact pin, and wherein the step of providing at least one switch comprises:

providing an alarm switch having first bellows configured to be out of contact with the first contact pin in a normal operating condition and to be in contact with the first contact pin in an alarm condition; and providing an integrity switch having a second bellows configured to be in contact with a second contact pin in a normal operating condition and to be out of contact with the second contact pin in a fault condition.

9. The method of claim 8, further comprising coupling a power source to at least one of the bellows and the contact pin.

\* \* \* \* \*